United States Patent [19]

Freis et al.

[11] Patent Number: 4,518,459

[45] Date of Patent: May 21, 1985

[54] METHODS OF DEINKING SECONDARY FIBERS

[75] Inventors: Richard E. Freis, Bloomington; James E. Maloney, Eagan; Thomas R. Oakes, May, all of Minn.

[73] Assignee: Economics Laboratory, Inc., St. Paul, Minn.

[21] Appl. No.: 458,432

[22] Filed: Jan. 17, 1983

Related U.S. Application Data

[63] Continuation of Ser. No. 93,744, Nov. 13, 1979, abandoned.

[51] Int. Cl.³ .............................................. D21C 5/02
[52] U.S. Cl. ............................................ 162/5; 162/8; 162/13; 162/80; 252/352; 252/358
[58] Field of Search ............................. 162/5, 8, 13, 80; 252/174.21, 174.22, 352, DIG. 1, 358

[56] References Cited

U.S. PATENT DOCUMENTS

| | | | |
|---|---|---|---|
| 2,856,434 | 10/1958 | Niederhauser et al. | 242/174.21 |
| 2,903,486 | 9/1959 | Brown et al. | 252/174.21 |
| 3,021,372 | 2/1962 | Dupre et al. | 252/174.21 |
| 3,340,309 | 9/1967 | Wiepert | 252/174.22 |
| 3,444,242 | 5/1969 | Rue et al. | 252/174.21 |
| 3,625,909 | 12/1971 | Berg et al. | 252/174.21 |
| 3,808,089 | 4/1974 | Van Koeppan | 162/5 |
| 4,162,186 | 7/1979 | Wood et al. | 162/5 |

FOREIGN PATENT DOCUMENTS

| | | | |
|---|---|---|---|
| 729071 | 3/1966 | Canada | 162/5 |
| 2143912 | 3/1973 | Fed. Rep. of Germany . | |
| 197607 | 7/1976 | Japan | 162/5 |

*Primary Examiner*—William Smith
*Assistant Examiner*—K. M. Hastings
*Attorney, Agent, or Firm*—Merchant, Gould, Smith, Edell, Welter & Schmidt

[57] ABSTRACT

Washing methods of deinking secondary cellulose fiber (i.e., removing unwanted non-cellulose materials therefrom) are disclosed. These washing methods (as opposed to flotation methods) generally involve deinking the fiber with surface active agent (surfactant).

The present invention utilizes a single foam-suppressing surface active agent consisting essentially of $$R-(Ar)-(OC_2H_4)m-(OC_3H_6)n-Y;$$

wherein R represents a monovalent higher aliphatic group containing from 6 to 24 carbon atoms,
Ar represents an aromatic residue,
—$(OC_2H_4)m$—being a poly(ethylene oxide) chain,
—$(OC_3H_6)n$—being a poly(propylene oxide) chain;
m is about 6 to about 15,
n is about 12 to about 48,
m:n is less than 1, and
Y is selected from the group consisting of hydroxyl and benzyl ether.

The present washing method of deinking reduces or eliminates objectionable foam, potentially provides energy savings yet maintains or improves the quality of the deinked fiber.

23 Claims, 2 Drawing Figures

METHODS OF DEINKING SECONDARY FIBERS

This is a continuation of application Ser. No. 93,744 filed Nov. 13, 1979, abandoned.

BACKGROUND OF THE INVENTION

This invention relates to methods of deinking or decontaminating secondary (i.e., not virgin or primary) cellulosic fiber or fiber sources. More particularly, the present invention relates to washing methods of deinking recycled cellulose fiber, and especially to those washing methods which employ aqueous media having therein surface active agents (surfactants).

FIELD OF INVENTION

Since at least the time of the early Egyptians, man has found it expedient to make and use paper. Until recently the majority of the paper produced world-wide has been produced by the conversion of primary or virgin fiber sources, e.g., plant fiber such as wood or cotton, into paper. More recently, a significant proportion of the cellulosic fiber stock used in the United States to make paper has become secondary fiber, i.e., fiber which has already been converted to paper at least once. Common classes of secondary fiber include reclaimed fiber which is paper mill processing waste and recycled fiber which is fiber which has previously been completely converted to its intended consumer end use and which has generally been returned to a paper maker for reuse. The present invention preferably utilizes recycled fiber which is capable of being deinked.

To supplement or replace virgin fiber feedstocks with substantially equivalent quality secondary fiber, a source of such fiber, e.g., ledger, newsprint, magazine, computer printout, board, etc., must be treated to remove ink and various other non-cellulosic materials or contaminants (e.g., binders, adhesives, coatings, wet-strength resins, pigments which were originally added to the paper to impart desirable properties thereto such as wet strength, color, gloss, etc.). The first step in any conventional treatment processes for removing unwanted, non-cellulose contaminants is repulping, i.e., treatment of the recycled secondary fiber to return it to its constituent cellulose fibers. Repulping (which is generally accomplished by contacting the recycled fiber with a heated, usually alkaline, aqueous medium having any of a variety of processing aids or chemicals therein) tends to break up and separate non-cellulosic materials from the cellulose fiber, thus making the non-cellulosic contaminants isolable therefrom.

Conventionally, two distinct, very different methods are employed to isolate the non-cellulosics to produce the deinked fiber after repulping, these two methods being referred to as "flotation" and "washing". Flotation methods of ink isolation generally involve passing a stream of air bubbles through an aqueous stream of dispersed cellulose fiber (i.e., the repulped cellulose fiber slurry), the cellulose fiber slurry having therein flotation agents, which promote the adhesion of ink particles to the air bubbles. The air bubbles rise to the top of fiber slurry and carry the ink particles with them thereby generating foam which can be removed from the flotation cell. This method relies upon an unequal distribution of the ink and fiber in the slurrying-flotation medium. That is, the fibers are supposed to remain below in the slurry while the ink rises to the top with the bubbles. In the "washing" method, on the other hand, the ink and fiber are more or less uniformly distributed throughout the slurry, and foaming or bubble formation, though present, is not particularly desired. The objective in the "washing" process is to get the ink to migrate from the fiber into an aqueous medium and then separate the aqueous medium from the fiber. Thus, the washing method typically comprises repulping, preferably under low-foaming conditions, of secondary fiber in an ink-removing aqueous medium, whereby the ink (and other non-cellulosic contaminants, if present) is mechanically and/or chemically removed from the fiber and distributed more or less uniformly throughout the aqueous medium; the repulping step is then typically followed by at least a partial change of the aqueous medium, e.g. dilution and/or screening.

Some removal of ink from the fiber can be accomplished in the "washing" method purely through the action of water being agitated with fiber. However, greater removal of ink can be achieved by blending a surface-active agent into the water. The surface-active agent can make the aqueous medium more efficient in removing ink from the fiber. Unfortunately, some of the surface-active agents (surfactants) which are effective in facilitating the removal of ink from fiber are not particularly effective in maintaining low foaming conditions. Conventional deinking operations which have employed surfactants in a washing-type deinking process have oftentimes generated excessive foam (in the repulping, washing, separation, or cleaning steps) to the point where various overflow basins or dump boxes had to be installed to receive the periodic over-foaming of the processing equipment. One proposed solution to this problem is to add chemical defoamers to the pulp or slurry to reduce foam. The defoaming chemicals do add to overall deinking efficiency, however, their primary function is merely to reduce foam.

Deinking carried out by the various conventional flotation processes can have several drawbacks. First, the capital investment for a flotation process is greater than the capital investment for a washing process. Secondly, a flotation process only operates efficiently if the consistency of the fiber feedstock is proper. Variation in feedstock consistency causes variation in the rate at which the air bubbles rise through the fiber stream thereby generating undesirable variation in the rate at which the slurry is decontaminated. Other variations in the feedstock can be troublesome. For example, if the secondary fiber was obtained from specially coated paper, natural or synthetic binding agents present in the paper or other non-cellulosic materials can have undesirable effects upon the flotation medium, as explained in West German laid-open application No. 2,143,912, published Mar. 8, 1973, page 1, third paragraph. In addition, the weight percent cellulose fiber in the fiber feedstock for a flotation process generally is lower than for a washing process, thus necessitating the use of more water. Thirdly, the size of the bubbles generated in the flotation cell must fall within definite diameter ranges in order to efficiently carry away the ink particles while leaving the cellulose fiber. The generation of air bubbles having a defined size is not technically difficult, but does complicate the process. Lastly, by their very nature, flotation processes generate foam or froth which must be collected, dewatered, and returned to the environment.

The present invention contemplates avoiding or mitigating the drawbacks of washing-type deinking methods while still obtaining the advantages of these methods, particularly as compared to the more complicated, more capital-intensive, and more sensitive flotation methods.

SUMMARY OF THE INVENTION

The present invention provides an improved washing method in which a particular class of nonionic surfactants provides both foam control (e.g. defoaming effects) and high deinking efficiency. In this invention, little or no foam is generated during the washing-type deinking methods. As a further indication of the efficiency of the process of this invention, it has unexpectedly been found that key process steps (e.g. repulping) can be carried out at relatively low temperatures. Still further, the nature of the aqueous repulping or washing medium can be simplified, since a single nonionic surfactant from the aforementioned class of surfactants (or a combination of surfactants from this class, if desired) can accomplish both a high level of deinking efficiency and good defoaming effects.

Briefly, the present invention provides an improved washing method for producing substantially decontaminated secondary fiber comprising the step of:

suspending the secondary fiber in a hot aqueous medium, the aqueous medium being heated to a temperature in the range of about 25° to about 85° C., preferably 35°–60° C., in the presence of a surface active agent comprising an oxyethylene glycol chain, wherein one terminal hydroxyl of the chain has been replaced with an aliphatic or alkylaromatic ether group, and the other terminal hydroxyl has been replaced with a polyoxypropylene group or a benzyl ether group.

In the usual practice of the process of this invention, contaminated secondary fiber is blended with water and the surfactant, thereby causing contaminants such as ink to separate from the fiber and become uniformly distributed throughout the aqueous medium, and the substantially decontaminated fiber is then substantially separated or isolated from the contaminated aqueous medium, e.g. by centrifuging, decanting, filtering, or, preferably, screening. The separation or recovery of the decontaminated fiber from the aqueous medium can be proceeded by a concentration or dilution step and can be followed by additional washing-type steps, e.g. dilution and/or screening, which steps can be accompanied by agitation of dilute fiber slurries. It is particularly preferred in this invention that the deinking begin with the repulping of the secondary fiber, i.e. that the surfactant used in this invention be present during the repulping step.

Surprisingly, the efficiency of surfactants used in this invention as determined in standard fiber brightness tests does not correlate with similar brightness tests used to determine efficiency of cotton detergency. Accordingly, it is difficult to explain the high level of deinking efficiency provided by the surfactants used in this invention. This invention is not bound by any theory, but it is presently theorized that a certain balance between hydrophilic and hydrophobic or lipophilic character can be obtained through the aforementioned modifications of an oxyethylene glycol chain, and this balance provides both deinking efficiency and defoaming. Thus, the aliphatic or alkylaromatic ether of the oxyethylene glycol is preferably terminated with either a benzyl ether group or a polyoxypropylene group which makes at least the same contribution to hydrophobe/hydrophile balance as the benzyl ether group would have made in its place. The resulting nonionic surfactant compound has a "foam break temperature" (defined subsequently) which is typically above room temperature but preferably not above 85° C., a typical "foam break temperature" range being 10°–85° C., optionally less than 60° C.

DEFINITIONS

Figure 1:
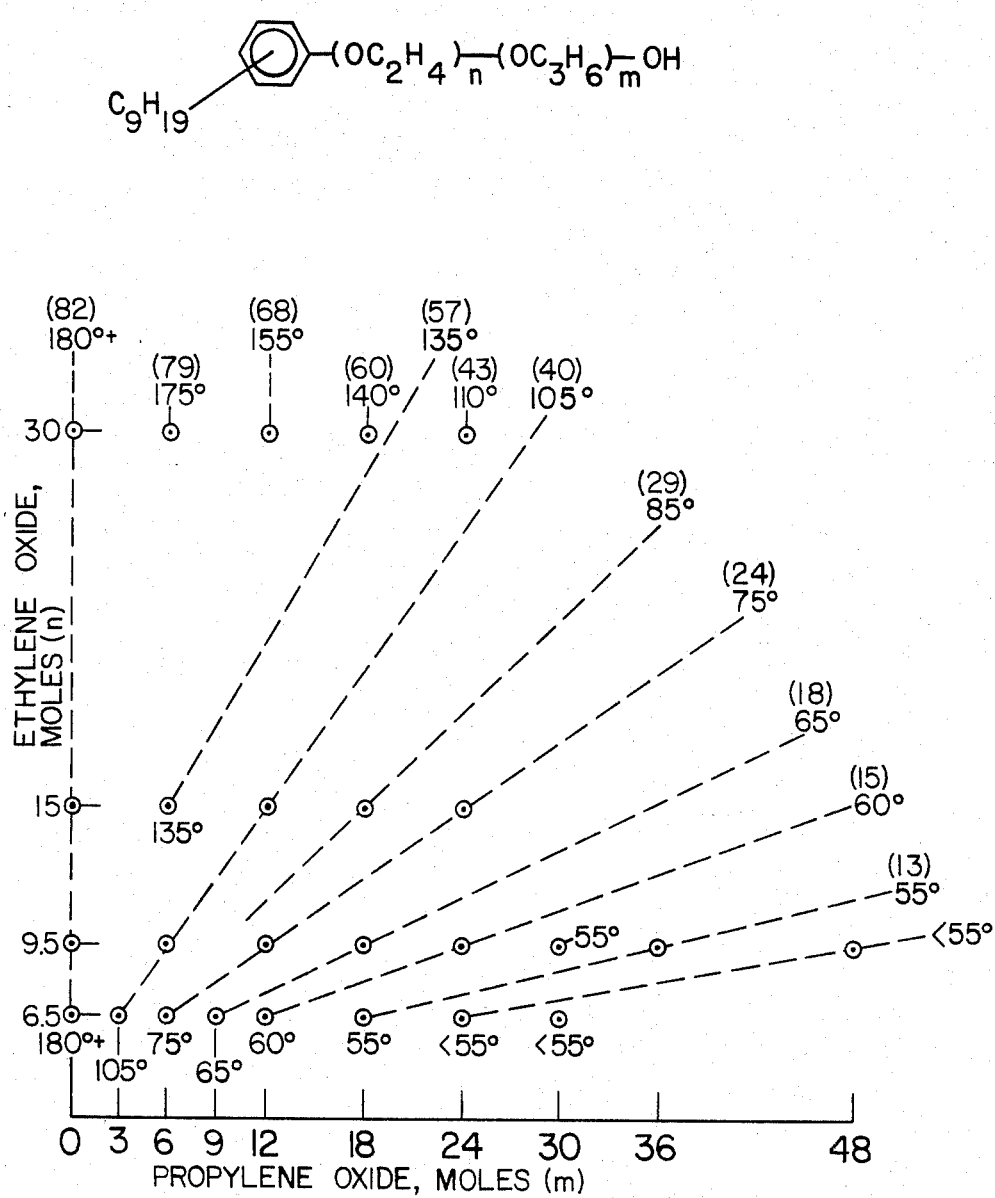
FIGS. 1 and 2 depict "foam break" isotherms (as defined subsequently) for various surfactants of the present invention.

As used in this application, the following terms have the indicated meanings.

"Deinking" means true chemical deinking in which an aqueous medium chemically extracts ink from secondary fiber. Such chemical deinking is to be distinguished from "mechanical" deinking in which the action of water in a vigorously agitated aqueous pulp physically removes ink from the surface of the fibers and disperses it or distributes it through the aqueous medium.

"Uniformly distributed" means suspended and/or dispersed and/or dissolved. Dispersed materials or dispersed phases are considered to be a colloidal and/or non-settling, while suspended materials may settle with time.

The terms "deinking" and "decontaminating" are generally used interchangeably herein to refer to the removal of non-cellulosic contaminants from secondary fiber. Such contaminants normally include printer's ink or other types of ink (including the ink vehicle, colorants such as dyes or pigments, etc.) but may also include coatings, binders, paper pigments, sizing, adhesives, and any other contaminants typically present in secondary fiber.

"Foam break temperature" is a measurement of surfactant behavior in aqueous media which is intended to serve as an alternative to the better-known cloud point test. The assignee of the present invention has discovered that "foam break temperature" measurements provide a more reliable indicator of the foam restriction ability of a given surfactant than the conventional cloud point determinations, particularly in paper mill processing and deinking operations. For some surfactants, the "foam break temperature" is substantially the same as cloud point temperature determined in a 1% solution. However, in a nonionic surfactant having a high ethylene oxide-to-propylene oxide ratio (EO/PO ratio), the "foam break temperature" and the cloud point temperature may diverge substantially, particularly under actual deinking conditions.

"Foam break temperatures" are measured by adding approximately 0.1% by weight of the nonionic surfactant to be tested to 3 liters of cold water contained in a temperature-controllable, metal 3 liter beaker. Upwardly projecting from the rim of the metal beaker a distance of about 2 feet (60 cm) so as to contain foam generated from the water in the metal beaker is a glass cylinder having a vertical ruler for measuring the height of a column of foam generated therein. Disposed near the open end of the glass cylinder and directed into the metal beaker is a number 30/15 "V-Jet" spray nozzle which is in communication with a pressure controllable water pump. The water pump circulates the contents of the beaker through the nozzle. For purposes of the evaluations herein, a pressure of 10 psi (70 kPa) was provided by the pump to the nozzle. A short period of time after activation of the pump, an equilibrium foam height is produced in the glass cylinder, this equilibrium foam height being characteristic of a given surfactant at a given temperature of the surfactant-water solution. At this point, the temperature of the water in the beaker is gradually increased, the height of the foam column being recorded at approximately 5° (F.) intervals. The temperature at which the height of the foam column falls to a height in the range of 3 inches to 5 inches (7.5 cm to 13 cm) above the surface of the water in the metal beaker is defined to be the foam break temperature for the material being tested. This definition of "foam break temperature" has been found to correlate well with the foam restriction ability of the material in actual deinking processes.

DETAILED DESCRIPTION OF THE INVENTION

As noted previously, surfactants used in this invention comprise an oxyethylene chain terminated at either end with ether groups. At one end, the ether group is aliphatic or alkylaromatic in nature, and at the other end the ether group is an oxypropylene chain which in turn is either hydroxy-terminated or benzyl ether-terminated. Alternatively, depending upon the desired hydrophobe/hydrophile balance, a benzyl ether group alone can be the other terminal group. A typical structural formula for preferred surfactants of this invention would be as follows:

wherein a is zero or 1,

Ar represents an aromatic residue, preferably monocyclic,

R represents an aliphatic group, n has a value from about 3 to about 50, m has a value from about zero to about 50, and Y is selected from the group consisting of hydroxy and benzyl ether and is benzyl ether when m equals 0.

The R group is typically saturated and contains at least 6 carbons. When a equals zero, R contains from 6 to 24 carbons; when a equals 1, R normally contains no more than 18 carbon atoms. In short, the $R(Ar)_a$ group contains at least 6 aliphatic carbon atoms and up to a total of 24 carbon atoms.

The foregoing structural formula can be considered to encompass two major classes of surfactants, i.e. (a) alkylene oxide adducts of alkylphenols, and (b) alkylene oxide adducts of higher (greater than $C_5$) aliphatic alcohols. To provide a hydrophilic segment in the nonionic surfactant molecule, the alkylphenol or the higher aliphatic alcohol is first condensed with ethylene oxide and then combined with a hydrophobic group which can be either an oxypropylene chain (obtained by condensation with propylene oxide) or a benzyl ether group or an oxypropylene chain terminated with a benzyl group. The oxyethylene chain is sometimes referred to as poly(ethylene oxide), and the polyoxypropylene chain is sometimes referred to as poly(propylene oxide), the vicinal oxide being typically meant.

Alkylphenol poly(ethylene oxide)-poly(propylene oxide) surfactants are generally prepared from alkylphenol-polyethylene oxide starting materials. Alkylphenol-polyethylene oxide starting materials are a well known class of surfactants that have long been used in many different industrial processes. Such conventional materials generally have a structure

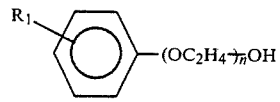

wherein $R_1$ is a linear or branched, monovalent alkyl radical having from 6 to 18 carbon atoms, preferably having from 8 to 12 carbon atoms and preferably being empirically representable by the formula $C_aH_{2a+1}$ (preferably, there is but one $R_1$ attached to the phenol nucleus, but multiple $R_1$'s are within the contemplation of this invention); n has a value of from 3 to 50 (preferably 6 to 15), each ($-O-C_2H_4-$) unit being derived from the ring opening of ethylene oxide

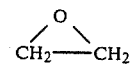

also known as oxirane. (Alkyl chains are sometimes represented herein by "C"$_a$ wherein "a" is the number of carbon atoms in the chain, e.g., $C_{12}$. This is to be understood to represent $C_aH_{2a+1}$ where a saturated species is intended.) A particularly well known class of alkylphenol poly(ethylene oxide) is nonylphenol polyethylene oxide (NP-EO). Nonylphenol-polyethylene oxides are characterized by the presence of a nine carbon atom alkyl chain attached to the aromatic nucleus of the phenol, there also being attached to the aromatic nucleus (in ortho, meta or para position with respect to the alkyl chain) a hydroxy-terminated polyether chain having from 1 to 40 ethylene oxide units, i.e., n has a value of 1 to 40. While such conventional NP-EO's can be synthesized in fairly pure fractions with a fairly specific value for n, they are generally sold as mixtures of molecules having a range of n values. These mixtures are characterized by their average value of n and hence, a common material is NP-EO$_{9.5}$ which has an average of 9.5 ethylene oxide units (moles) per nonylphenol nucleus (n=9.5). Nonylphenol-polyethylene oxides having average n values from 1 to 40 are commercially available from various companies including the GAF Company under the trade designation "Igepal", Rohm and Haas Company under the trade designation "Triton" and Jefferson Chemical Company under the trade designation "Surfonic".

The present invention utilizes alkylphenol polyethylene oxides having attached to the distal end of the polyethylene oxide chain, a plurality of propylene oxide units ($-OC_3H_6-$) or a benzyl ether group, the polypropylene oxide chain (when employed) preferably being hydroxy-terminated ($-OH$) or benzyl-terminated ($-CH_2C_6H_5$) to provide a structure of the sort

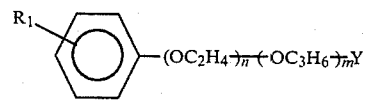

wherein $R_1$ is defined as above, Y is selected from the group consisting of hydroxy or benzyl ether, n is defined as above and m has a value in the range of 0 to 50, preferably about 4 to about 48 (Y is benzyl ether when m=0). It has been found necessary for the polyethylene oxide segment to be positioned adjacent to the hydrophobic moiety (i.e., the alkyl phenoxy moiety or the higher molecular weight alcohol moiety) in order for the advantageous aspects of the present invention to be achieved. It is normally preferred that m have a non-zero value. When m is not zero but Y is hydroxyl, it is further preferred that the relatively hydrophobic segment represented by $(OC_3H_6)_m$ have sufficient propylene oxide units to make a contribution to the hydrophobic character of the molecule at least equal to that contributed by a benzyl group. It has also been found that replacement of the terminal hydroxyl group of the oxypropylene chain with various other terminal groups such as benzyl ether has not reduced the utility of the alkylphenol-poly(ethylene oxide)-poly(propylene oxide) in the present invention. However, if the ratio of propylene oxide (PO) to ethylene oxide (EO) units is sufficiently high, it is ordinarily preferred that Y be a hydroxyl group.

The hydroxy-terminated nonylphenol-polyethylene oxide-propylene oxides (NP-EO-PO-OH) of the present invention are prepared according to methods which are well known to one skilled in the art. For example, NP-EO-PO-OH may be prepared by reacting NP—EO (e.g., "Igepal" or "Triton") with propylene oxide at e.g. 100° C. to 150° C., 1 to 4 atmospheres pressure, in the presence of an alkaline catalyst, e.g., KOH. U.S. Pat. No. 3,021,372 to Dupre et al specifically describes the preparation of the preferred hydroxy-terminated octylphenol and nonylphenol-polyethylene oxide-polypropylene oxides, the teaching of the '372 patent being incorporated by reference herein. Generally, it is preferable that the catlyst used to prepare the NP-EO material not be removed prior to addition of the PO segments (i.e., unneutralized NP-EO should be used).

A second type of surfactants within the class of surfactants found useful in the practice of the present invention includes hydroxy-terminated or benzyl ether-terminated ethylene oxide-propylene oxide adducts of higher molecular weight or long chain alchols, the polyethylene oxide segment connecting the higher alcohol moiety to the polypropylene oxide segment. "Higher molecular weight" or "long chain" alcohols herein means linear or branched, saturated or unsaturated, primary or secondary alcohols having from 6 to about 24 carbon atoms generally having a molecular weight in the range of about 75 to 300, these materials sometimes being referred to as "fatty alcohols". Nonionic surfactants produced from the higher molecular weight alcohols can be represented as follows:

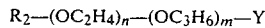

$$R_2-(OC_2H_4)_n-(OC_3H_6)_m-Y$$

wherein $R_2$ is a linear or branched, saturated or unsaturated monovalent aliphatic chain having from about 6 to about 24 carbon atoms (preferably 10 to 18), Y is selected from the group consisting of hydroxy or benzyl ether, n has a value of about 3 to 50 (preferably 6 to 15), m has a value of about 0 to about 50 (preferably about 4 to about 48), with Y being benzyl when m=0.

The preferred, hydroxy-terminated higher molecular weight alcohol EO-PO adducts may be prepared by adding the EO-PO polyether segments to saturated or unsaturated alcohols having the desired carbon backbone. Alcohols useful herein may be synthetic alcohols (i.e., alcohols prepared by the well-known Ziegler or carbonylation processes) or alcohols generally prepared by the reduction of naturally occurring fatty acids to fatty alcohols. Useful fatty acid starting materials may be obtained by extraction from natural sources such as coconut oil, palm oil, tallow, lard, and tall oil. The carbon chain length and structure of the alcohol is determined by the synthetic conditions or the nature of the fatty acid starting material employed. Of course, specific desired alcohol structures may be obtained from natural sources by distillation or the like, or by the above synthetic methods followed by distillation. Particularly preferred higher alcohol EO-PO adducts for use in the present invention are synthesized from a mixture of primarily 16 carbon atom alcohol and 18 carbon atom alcohol with an $EO_5(PO)_{13}$—OH hydroxy-terminated polyether chain being attached thereto.

As noted above, the nonionic surfactants of the present invention are usually hydroxy-terminated or benzyl ether-terminated. Of course, hydroxy-termination results when the propylene oxide units are added to the polyethylene oxide chain (which also would be hydroxy-terminated). A terminating benzyl ether group could be added to the structure by reacting benzyl chloride with the hydroxy-terminated alkylphenol-EO-PO material after the NP-EO-PO-OH material had been reacted with metallic sodium. Generally this could be accomplished at a temperature in the range of about 200° F. (93° C.) to 300° F. (150° C.).

The balance between hydrophilic and hydrophobic properties in preferred surfactants used in this invention can be considered to be roughly determined by the formula weight ratio of the hydrophilic portion to the hydrophobic portion. When both EO and PO units are present in the surfactant molecule, the EO/PO ratio is a major factor in determining hydrophobe/hydrophile balance for any given $R(Ar)_a$ terminal group. If no PO is present (m=0), the size of the oxyethylene chain (the value of n) in relation to the hydrophobic contribution by the terminal benzyl ether is a major factor in this balance—again, for a given $R(Ar)_a$ group.

In those cases wherein the EO/PO ratio is a major factor in determining hydrophobe/hydrophile balance, typical ratios of EO to PO (i.e. ratios of n to m) range from about 1:4 to 4:1. Lower "foam break temperatures" are typically encountered when the EO/PO ratio is less than 1:1 and particularly when there are at least about 6 propylene oxide units. Selection of a suitable hydrophobe/hydrophile balance is preferably achieved with reference to the aforementioned "foam break temperature", rather than with reference to either cloud point or theoretically-derived HLB values. As noted previously, the foam break temperatures are considered to be a particularly reliable indicator of the desired balance of water solubility or dispersibility, defoaming properties, and deinking properties in the context of this invention. Other criteria for selecting preferred nonionic surfactants involve reference to repulping and/or deinking temperatures, deinking efficiency as determined by standard fiber brightness tests, and similar practical criteria.

With reference to the Figures, one technique for selection of the appropriate nonionic surfactant will be described.

In FIG. 1, the foam break temperature characteristics of nonylphenol-EO-PO surfactants with hydroxy-termination are summarized. The vertical axis of FIG. 1 indicates the number of moles of ethylene oxide condensate ($—OC_2H_4—$) and the horizontal axis indicates the number of moles of propylene oxide condensate ($—OC_3H_6$) per mole of nonylphenol moiety ($C_9H_{19}$—$C_6H_4$—). The lines on the Drawing which generally radiate from the origin (foam break isotherms) connect the various combinations of EO and PO which provide the indicated foam break temperature thus giving the EO-PO combination which will provide low or no foaming.

In a practice of the present invention, the deinking process is started and run until it attains equilibrium (i.e., it is run for a period of time sufficient to eliminate major temperature variations). Having reached equilibrium, the temperature profile for the entire deinking process is determined (i.e., the variation of temperature of the deinking medium along the deinking process is recorded). Generally speaking, the greatest potential for foaming will occur where washing, filtering, or agitation, etc., is accomplished at the lowest temperature. Hence, in choosing the surfactant to be used, the lowest temperature encountered in the process will be determined and that temperature will be used to select an isotherm from FIG. 1. For example, if the lowest temperature encountered throughout the deinking process is about 60° F. (15° C.) then either of NP-$EO_{6.5}PO_{12}$-OH or NP-$EO_{9.5}PO_{24}$-OH would appear to give acceptable, equivalent low foaming behavior as indicated by the foam break test.

Figure 2:
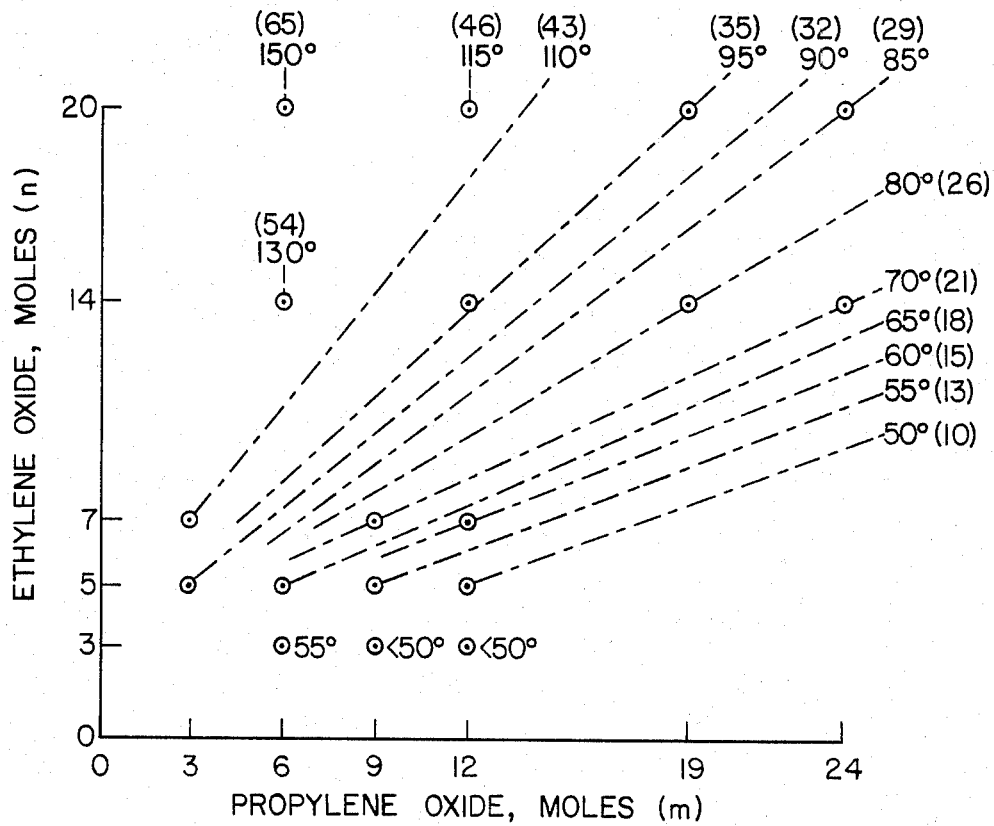

FIG. 2 illustrates foam break isotherms which have been determined for higher molecular weight alochol-EO—PO—OH surfactants, the use of which is disclosed herein. The particular surfactant tested in FIG. 2 is a mixture of 10 carbon atom, 12 carbon atom and 14 carbon atom alcohols (i.e., $R_2$ is about 28–34% $C_{14}$ 35–41% $C_{12}$ and 27–33% $C_{10}$) to which there has been added polyether chains of the indicated composition. Similar isotherms are obtained for $C_{16}/C_{18}$ (approximately 60% $C_{16}$, 40% $C_{18}$) $C_{14}/C_{18}$ and $C_{12}/C_{18}$ alcohol-EO-PO adducts. It is theorized that similar foam break characteristics would be found for any of the surfactants, the use of which is disclosed herein.

Hence, in a practice of this invention deinking process optimization could be accomplished for any of the classes of surfactants disclosed and any of the individual compounds therein. Such isotherms would be determined by measuring the foam break temperature (as described above) for various combinations of EO and PO units on the particular higher alcohol or alkylphenol.

Selection of the foam break temperature is particularly important to consider in connection with the temperature at which the washing-type deinking process will be carried out. In a conventional deinking process utilizing water as the deinking medium, alone or in combination with the typically used surfactants and/or defoamers, the repulping step generally involves heating the aqueous secondary fiber pulp or slurry to, for example, 70° C. (160° F.). As the fiber slurry is processed, it tends to cool. As the slurry cools, it is well known that the surfactants conventionally used tend to promote foam formation. One technique used to reduce foam is to warm the aqueous medium above the temperature at which the particular surfactant will provide some defoaming. (According to findings available to the applicant, the defoaming is most likely to occur at temperatures above the foam break temperature.) In the typical prior art practice, the slurry is warmed by passing steam through the slurry as it proceeds down the deinking process.

In the present invention, these typical prior art temperatures can be used (e.g. temperatures up to 85° C.), but lower repulping temperatures are greatly preferred, e.g. temperatures in the range of 30° C. (86° F.) to 60° C. (140° F.). It has been found that once the temperature characteristics of a given deinking process have been determined, the surfactant can be selected so that foam production may be restricted or eliminated. This may mean that, as the temperature profile of a given deinking process changes during the year (the temperature of wash water which is usually simply pumped from a convenient outdoor water source may vary by many degrees from the hottest part of the summer to the coldest months of the winter) it may be desirable to select a surfactant having a different hydrophobe/hydrophile balance (e.g. EO/PO or EO/benzyl ratio) so as to reduce foam production. In other words, one would typically match the foam break temperature with the lower end of the repulping temperature range to ensure that the aqueous repulping medium will generally be warmer than the foam break temperature, even after the repulped secondary fiber has started to cool down from the initial processing stages, or even when the outdoor water source happens to be at winter temperature. Conversely, any advantage provided by the relatively high temperature of an outdoor water source during the summer can be utilized through a different surfactant selection.

The Process

As noted previously, repulping of the secondary fiber is an important step in the typical washing-deinking process. Repulping without the presence of a surfactant is suitable for this invention, thereby enabling the skilled artisan to postpone addition of the surfactant to a later step in the process, e.g. a fiber slurrying step following repulping. However, surfactants useful in this invention can also be present (and preferably are present) during repulping, thereby achieving a considerable amount of chemical separation of ink from the secondary fiber during this key step.

During repulping, the aqueous medium is preferably agitated. The pH of the medium can vary over a wide range (including both acidic and alkaline pH values), the surfactants used in this process being effective over this wide range of pH values. The consistency (i.e. percent solids) during repulping is similar to that of any typical paper pulp. Such paper pulp consistencies are normally well under 10% by weight to avoid excessive difficulty in agitating, pumping, or otherwise manipulating the fiber slurry or pulp. On the other hand, a consistency below about 2% by weight would mean that the process would have to deal with enormous amounts of water. During the initial stages of the repulping step, typical consistencies range from about 3 to about 6 or 7% cellulosic fiber (based on the weight of the entire mass of pulp, including additives, etc.). After the initial deinking has been accomplished, it may be desirable to dilute the repulped secondary fiber to a consistency below 3% to facilitate separation of the relatively ink-free fiber from the aqueous pulping medium which now contains the contaminants in a state of more or less uniform distribution.

Adjustments to the pH of the repulping medium can be desirable, for example, 1% to 3% by weight of caustic soda, based on the weight of cellulosic fiber in the repulping medium can be added. This level of sodium hydroxide addition would be typical for a pulp having a consistency of 4 to 6% and would work out to approximately 20 to 60 pounds of NaOH per ton of fiber.

Any of the commercially available apparatus commonly used to provide repulping of secondary fiber (e.g. the "Hydrapulper") can be used in the repulping step.

As noted previously, a typical practice of the repulping step in this invention achieves at least some extraction or separation of the contaminants, particularly ink, from the cellulosic fiber in the repulped mass. Since the contaminants are dispersed and/or dissolved and/or suspended throughout the aqueous repulping medium, it is desirable to separate the aqueous medium from the fiber so that the contaminants will have less of a tendency to redeposit on the surfaces of the fiber. The most preferred separation technique involves screening, i.e. deposition of the pulp onto a foraminous surface capable of retaining the fiber while the aqueous medium drains through the holes in this surface. The fiber deposited on the screen can be slurried in water and screened again. In this manner, the relatively pure or relatively contaminant-free fiber can be put through as many separation steps as desired. This technique of carrying away the contaminants is sometimes referred to as "washing" and is typically the technique which gives the "washing"-type deinking process its name. Neither flotation steps nor foaming is required during washing. The use of the nonionic surfactants described herein permits the use of conventional washing machinery and thereby avoids the expense and drawbacks of flotation-type equipment. In addition, the versatility of conventional washing equipment is expanded, because more and different grades of secondary fiber can be decontaminated according to the teachings of this invention. Among the conventional types of washing apparatus suitable for us in this invention are the Lancaster washer, the sidehill washer, and the decker washer, all of which are well known in this art.

In an optional step which can be used in this invention, the repulped fiber may be partially cleaned of foreign matter such as dirt, staples, paper clips, etc. This type of foreign matter can be cleaned from the fiber by means of a series of screens of diminishing mesh size. Centrifugal cleaners have also been utilized to separate this type of foreign matter, since the dirt, staples, paper clips, and other foreign matter of this type typically encountered in the treatment of secondary fiber usually differs quite markedly in density as compared to the cellulose and its normal contaminants.

After this optional removal of foreign matter, the repulped, cleaned stock may optionally be either concentrated or diluted; that is, water may be either added or taken away.

Concentration or thickening of the fiber stock can be accomplished by various techniques such as vacuum-assisted filtration or decker-assisted removal of water.

During the aforementioned washing step or steps, the separation of the fiber from the aqueous medium can be facilitated with vacuum, gravity, centrifugally-assisted filtration, or other concentration techniques. Of the previously discussed types of washing equipment, the sidehill washer is preferred from the standpoint of low capital investment per amount of decontamined fiber produced.

Subsequent to completion of the desired number of washing steps, the decontaminated cellulosic fiber may be further treated (e.g. by bleaching) to further improve color or other characteristics. Such additional treatments are optional in the context of the present invention.

In conventional deinking operations, there is a tendency to generate foam in any of several of the aforementioned deinking steps, e.g. the washing steps. In the practice of the present invention, excessive foaming has been substantially reduced if not completely eliminated, but decontamination efficiency has not been sacrificed. Reduction of foaming increases the efficiency of the processing machinery (particularly in terms of throughput) because the volume handled by the processing machinery is not occupied by a great deal of foam. In addition, reduction of foam reduces machinery downtime caused by over-foaming into the receiving basins. In effect, reduction of foam in the practice of this invention tends to increase the cost effectiveness of a washing-type deinking process.

In a paper mill-scale practice of the present invention, a quantity of secondary fiber which is to be deinked is charged to a repulping apparatus (e.g., "Hydrapulper"), to a consistency of 6%, i.e., 6% fiber, 94% $H_2O$, there being mixed with the secondary fiber water which has been heated to a temperature in the range 80° F. (25° C.) to 180° F. (85° C.). Additionally, the nonionic surfactants of the present invention are added, there being 0.1% to 1% by weight surfactant based upon the total weight of the secondary fiber. Optionally, depending upon the specific conditions employed, a base such as caustic soda, sodium silicate, sodium carbonate, sodium phosphate, etc. may be added to the extent of up to 3% of the weight of the secondary fiber (optionally, acids such as sulfuric acid may be employed in the repulping solution). Other processing aids e.g., talc or water conditioner, which do not inhibit operation of the present invention may be added, generally before repulping. At this point the entire mass preferably is vigorously agitated e.g., for 30 minutes to 180 minutes, to assist separation of the non-cellulose materials from the secondary fiber and to promote separation of the cellulose fibers. Such agitation may be accomplished, for example, in attrition or non-attrition pulpers in a batch or continuous process.

After the preferred vigorous agitation, a suspension of repulped cellulosic fiber is produced, there being suspended in the fiber non-cellulosic materials such as inks, binders, etc., such non-cellulosic materials being easily washable from the cellulose fiber suspension. This suspension contains the nonionic surfactants of the present invention e.g., nonylphenol $(EO)_{9.5}(PO)_{14}$-OH, as well as any other additives.

Next, the repulped, partially cleaned fiber is put through one or more washing steps, as described previously, e.g. washing of the fiber using a sidehill washer, a Lancaster washer, or the like. The resulting decontaminated secondary fiber is suitable for use in a conventional paper making machine, e.g. a Fourdinier.

The principles and practices of the present invention are illustrated in the following non-limiting Examples.

EXAMPLE 1

Illustrating the preparation of hydroxy-terminated nonylphenol $(EO)_{9.5}(PO)_{24}$.

A purgable, pressurizable 2,000 gallon (7,500 liter) stainless steel reactor, having stirring means and a temperature control mechanism is charged with 1,614 pounds (732 kg) nonylphenol. The nonylphenol is stirred (10 minutes) while nitrogen is bubbled through it. Forty-five pounds (20 kg) potassium hydroxide is added to the nonylphenol, the reactor being multiply purged (e.g., 3 times) with nitrogen and being left with a slight N$_2$ overpressure. At this point, the contents of the reactor are heated to 230° F. (110° C.) at which temperature, the reactor is again purged with dry nitrogen leaving a nitrogen overpressure. Heating of the reactants is continued to 250° F. (120° C.) at which time heating is discontinued and the vessel is multiply purged as described above. Approximately 3,070 pounds (1,390 kg) ethylene oxide is charged to the reactor at the rate of 5 gallons (19 liter) to the 12 gallons (45 liter) per minute, the rate of ethylene oxide addition and heating or cooling of the reactor being monitored to maintain the stirred reactant medium at a temperature in the range of 290° F.±10° F. (143° C.±5.5° C.). The reactor pressure should be kept to less than 60 psi (400 kPa) during EO addition. Ethylene oxide is added to the point where the nonylphenol ethylene oxide has a 1% aqueous cloud point (i.e., in a 1% aqueous solution of the material, the temperature at which the material begins to come out of solution, as evidenced by the clouding) in the temperature range of 127° F. (53° C.) to 137° F. (58° C.). After completion of the EO addition, the mixture is permitted to react at 290° F.±10° F. (143° C.) for 20 minutes. Next, PO is added until the cloud point in a 20% butyl carbitol solution of the EO-PO adduct is 120° F. (48° C.) to 123° F. (50° C.). Continued addition of PO further reduces the adduct cloud point.

After PO addition, the completed product is cooled to 175° F. (79° C.) and 45 pounds (20.4 kg) glacial acetic acid is added to the product to neutralize the KOH, the product being stirred for an additional 30 minutes. This completes synthesis of nonylphenol-EO-PO.

Nonylphenol-(EO)$_{9.5}$ was employed to synthesize surfactants of the present invention with 0, 6, 12, 18, and 24 moles propylene oxide. These surfactants then were used to determine their efficacy in cotton detergency and brightness of deinked handsheets prepared from ledger stock as described in Example 2. The results of this evaluation are contained in Table I. Unexpectedly, cotton detergency was found to decrease with increasing amounts of PO while the brightness (both when measured as described above and by its difference from a standard, i.e. a delta value) of the hand sheet was found to increase. In effect, the deinking performance of the present surfactants was found to be opposite what would be predicted from their cotton detergency.

TABLE 1

| Moles PO | Brightness Reflectometer | Delta | Cotton Detergency Reflectometer Value |
|---|---|---|---|
| 0 | 77.5 | 13.8 | 55 |
| 6 | 78 | 13.6 | 47 |
| 12 | 80.5 | 11.2 | 41 |
| 18 | 80.5 | 11.2 | 38 |
| 24 | 84 | 7.4 | 35 |

Cotton detergency is determined by the brightness of the washed cloth.

EXAMPLE 2

Illustrating the preparation of handsheets for laboratory evaluation of surfactants.

Fifteen grams of the stock which is to be deinked (e.g., ledger) is charged to a "Waring" blender with 375 ml water and is agitated for one minute. The contents of the blender are poured into a beaker and the pH of the solution is increased to 10-11 by the addition of about 6 NaOH pellets (0.6 g). Next 0.1 gram of the surfactants to be tested is added. The entire mixture then is heated to the desired deinking temperature, e.g., 150° F. (65° C.), while being stirred and is maintain at that temperature for at least 10 minutes.

Next the heated mixture is diluted to about 3 liter with water and poured down a 40 mesh (U.S. standard sieve size) screen maintained at about a 37 degree angle with respect to horizontal. This simulates a sidehill washer and concentrates the fiber while washing away the ink particles. Dilution and washing are repeated to produce the deinked secondary fiber.

Next the deinked fiber may be bleached by the addition of liquid bleach (e.g., "Purex") with adjustment of the solution pH to 10-11 (3 pellets NaOH) may be added.

Lastly, hand sheets of the deinked fiber are prepared and their brightness measured as described above. Hand sheets are prepared by any of a number of the methods conventionally used in the U.S., e.g., the method described in TAPPI standard T2-5 OS-71, etc. Generally, four hand sheets are prepared by diluting the washed, deinked fiber with three liters of water as discussed above.

EXAMPLE 3

Illustrating the preparation of benzylether-terminated higher molecular weight alcohol polyethylene oxide.

A reactor as described in Example 1, was charged with a mixture of 23% by weight (of the final mixture) "Alfol" C$_{10}$-C$_{14}$ alcohol, 0.23% by weight potassium hydroxide (KOH) and heated to a temperature in the range of 240°-250° F. (116°-121° C.) while being purged with nitrogen. To the heated "Alfol" was added about 77% by weight ethylene oxide, the temperature of the reactor being permitted to rise to 320° F. (160° C.) while the pressure in the reactor was maintained at less than 60 psi (400 kPa) until all the ethylene oxide per mole of alcohol were added.

To a new reactor which is similar to the reactor described in Example 1 with the exception that it has an air lock suitable for the addition of metallic sodium, was charged 86% of the above alcohol-EO product, 12% metallic sodium, and 12% by weight benzyl chloride. The addition of metallic sodium was accomplished after the alcohol-EO product was heated to a temperature of about 235° F. (113° C.) and the reaction vessel was multiply purged with nitrogen. The metallic sodium is added (through the air lock) in small amounts so that sodium addition is completed in a period of about two hours. Hydrogen gas is produced when the metallic sodium is added to the above mixture and therefore it is important that the system be completely purged with nitrogen on a regular basis.

After completion of sodium addition the temperature of the mixture is maintained at 235° F. (113° C.) for a period of about two hours, the system being multiply purged to remove any hydrogen generated. After about two hours, the system is purged with air to ensure complete removal of the hydrogen.

At this time, the benzyl chloride is added, the reaction mixture being cooled to maintain its temperature in the range of 240°-250° F. (115°-121° C.). The rate of addition of benzyl chloride may be adjusted to maintain the temperature of the reaction mixture within the intended range. When the benzyl chloride has been added, the system is stirred for an additional two hours at a temperature in the range of 240°-250° F. Once the benzyl chloride has been added, it is necessary to remove the sodium chloride produced in the reaction.

This can be accomplished by cooling the product to a temperature in the range of 200° F. (93° C.) to 230° F. and extracting the sodium chloride with water. To remove any sodium chloride entrained in the product, it is necessary to heat the product to 275° F. (135° C.) and again washing it with water. Lastly, a filter aid (such as diatomaceous earth) is added to the product and it is filtered to provide the benzyl-terminated alcohol-EO material.

Various modifications and alterations of the invention will become apparent to those skilled in the art without departing from the scope and spirit of the invention, and it should be understood that this invention is not to be limited to the illustrative embodiments and Examples set forth herein.

What is claimed is:

1. A washing method for the production of substantially decontaminated secondary fiber from relatively contaminated secondary fiber, comprising the steps of:
   (a) suspending the relatively contaminated secondary fiber in an aqueous medium in the presence of less than about 1% of the weight of said contaminated fiber of a single foam-suppressing surface active agent consisting essentially of:

$$R\text{—}(AR)\text{—}(OC_2H_4)_m\text{—}(OC_3H_6)_n\text{—}Y;$$

wherein R represents a monovalent higher aliphatic group containing from 6 to 24 carbon atoms,
   Ar represents an aromatic residue,
   —$(OC_2H_4)_m$—being a poly (ethylene oxide) chain,
   —$(OC_3H_6)_n$—being a poly (propylene oxide) chain;
   m is about 6 to about 15,
   n is about 12 to about 48,
   m:n is less than 1, and
   Y is selected from the group consisting of hydroxyl and benzyl ether, the temperature of said aqueous medium being in the range of about 25° C. to about 85° C., whereby contaminants of the relatively contaminated secondary fiber become uniformly distributed throughout said aqueous medium; and
   (b) substantially separating the resulting substantially decontaminated secondary fiber from the resulting contaminant-containing aqueous medium.

2. A process according to claim 1 wherein the aqueous admixture is heated to a temperature in the range of about 80° F. (25° C.) to 130° F. (55° C.).

3. A process according to claim 1 wherein the admixture is heated to a temperature in the range of about 80° F. (25° C.) to 100° F. (37° C.).

4. A method according to claim 1 wherein the separating step further includes agitating the fiber while it is heated.

5. A method according to claim 4 wherein agitation is accomplished by means of an attrition or a non-attrition pulper.

6. A method according to claim 1 wherein Y is hydroxyl.

7. The method of claim 1 wherein R has from about 9 to about 15 carbon atoms.

8. A washing method to produce deinked secondary fiber via an intermediate suspension of secondary fiber having interspersed therein ink particles which are capable of being readily isolated from said suspension by washing comprising the steps of:
   separating the ink particles and the secondary fiber to produce the suspension by heating the fiber to a temperature in the range of 120° F. (50° C.) to 180° F. (85° C.) in an aqueous medium having therein less than about 1% of the weight of said secondary fiber of a single foam-suppressing nonionic surface active agent consisting essentially of:

$$R\text{—}(Ar)\text{—}(OC_2H_4)_m\text{—}(OC_3H_6)_n\text{—}Y;$$

wherein R represents a monovalent higher aliphatic group containing from 6 to 24 carbon atoms,
   Ar represents an aromatic residue,
   —$(OC_2H_4)_m$— being a poly(ethylene oxide) chain,
   —$(OC_3H_6)_n$— being a poly(propylene oxide) chain;
   m is about 6 to about 15,
   n is about 12 to about 48,
   m:n is less than 1, and
   Y is selected from the group consisting of hydroxyl and benzyl ether; and
   isolating the ink particles and the surfactant from the secondary fiber by washing the particles from the suspension to produce said deinked fiber.

9. The method of claim 8 wherein the aqueous admixture is heated to a temperature in the range of about 80° F. (27° C.) to 130° F. (55° C.).

10. The method of claim 8 wherein the aqueous admixture is heated to a temperature in the range of 80° F. (27° C.) to 100° F. (37° C.).

11. The method of claim 8 wherein R is a monovalent alkyl group selected from octyl, nonyl or dodecyl.

12. The method of claim 8 wherein the aqueous admixture is alkaline.

13. The method of claim 12 wherein the alkalinity is due to the presence of a base selected from the group consisting of alkali metal hydroxides, silicates, carbonates or phosphates.

14. The method of claim 8 wherein the aqueous admixture is acidic.

15. The method of claim 8 wherein the isolating step is accomplished by means of vacuum, gravity or centrifugal filtration or concentration of the cellulose fiber.

16. The method of claim 8 wherein the isolating step comprises washing the ink particles from the fiber by tumbling the slurry down a sidehill washer.

17. A method of reducing foam generated in a washing-type process for deinking secondary fiber, the process comprising:
   (a) forming an aqueous deinking medium having therein less than about 1% by weight of the secondary fiber of a single foam-suppressing nonionic surface active agent consisting essentially of:

$$R\text{—}(Ar)\text{—}(OC_2H_4)_m\text{—}(OC_3H_6)_n\text{—}Y;$$

wherein R represents a monovalent higher aliphatic group containing from 6 to 24 carbon atoms,
   Ar represents an aromatic residue,
   —$(OC_2H_4)_m$— being a poly(ethylene oxide) chain,
   —$(OC_3H_6)_n$— being a poly(propylene oxide) chain;
   m is about 6 to about 15,
   n is about 12 to about 48,
   m:n is less than 1, and
   Y is selected from the group consisting of hydroxyl and benzyl ether, said surfactant being selected to restrict or eliminate foam at the coldest temperature to which the aqueous deinking medium is exposed in the deinking process; and
   (b) deinking the secondary fiber with the deinking medium having therein the selected surfactant by separating the secondary fiber and ink particles and isolating the ink particles from the fiber by washing to produce the deinked fiber.

18. The method according to claim 17 wherein m is about 6.5-9.5, n is about 12-48 and the surfactant is effective to restrict or eliminate foam when the deinking process causes the medium to be exposed to temperatures below 60° F. (15.5° C.)

19. A washing method for the production of substantially deinked secondary fiber from ink-containing secondary fiber, comprising the steps of:

(a) repulping said ink-containing secondary fiber, with suppression of foam, in an aqueous repulping medium containing a foam-suppressing amount of less than about 1% of the weight of the ink-containing secondary fiber of a single foam-suppressing surface active agent consisting essentially of:

$$R—(Ar)—(OC_2H_4)_m—(OC_3H_6)_n—Y;$$

wherein R represents a monovalent higher aliphatic group,

Ar represents a divalent monocyclic aromatic residue, $—(OC_2H_4)_m—$ being a poly(ethylene oxide) chain,
$—(OC_3H_6)_n—$ being a poly(propylene oxide) chain;
m is about 6 to about 15,
n is about 12 to about 48,
m:n is less than 1, and
Y is selected from the group consisting of hydroxyl and benzyl ether, said aqueous repulping medium having a temperature above 25° C. but falling below about 60° C. before said repulping is completed, the ink present in said ink-containing secondary fiber becoming uniformly distributed through said aqueous repulping medium during said repulping; and (b) depositing the resulting substantially deinked secondary fiber on a foraminous surface and permitting the resulting, ink containing aqueous repulping medium to drain through the holes in said foraminous surface.

20. A method according to claim 19 wherein the nonionic surface active agent has the structure:

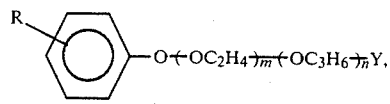

wherein R is a monovalent alkyl chain having from about 6 to 18 carbon atoms,
$—(OC_2H_4)_m—$ being a poly(ethylene oxide) chain,
$—(OC_3H_6)_n—$ being a poly(propylene oxide) chain;
m has a value from about 6 to about 15,
n has a value from about 12 to about 48,
m:n is less than 1, and
Y is selected from the group consisting of benzyl ether.

21. A method according to claim 19 wherein R is a monovalent alkyl group selected from octyl, nonyl or dodecyl.

22. A method according to claim 19 wherein the aqueous admixture is alkaline.

23. A process according to claim 22 wherein the alkalinity is due to the presence of a base selected from the group consisting of alkali metal hydroxides, silicates, carbonates or phosphates.

* * * * *